(12) United States Patent
Harkness

(10) Patent No.: US 6,589,776 B1
(45) Date of Patent: Jul. 8, 2003

(54) METHOD FOR TREATING CONTAMINATED MEDIA

(75) Inventor: Mark Robert Harkness, Troy, NY (US)

(73) Assignee: General Electric Company, Schenectady, NY (US)

( * ) Notice: Subject to any disclaimer, the term of this patent is extended or adjusted under 35 U.S.C. 154(b) by 236 days.

(21) Appl. No.: 09/695,490

(22) Filed: Oct. 24, 2000

(51) Int. Cl.$^7$ .................................................. B09B 3/00
(52) U.S. Cl. ................................................... 435/262.5
(58) Field of Search ....................................... 435/262.5

(56) References Cited

U.S. PATENT DOCUMENTS

| | | | | |
|---|---|---|---|---|
| 5,277,815 A | | 1/1994 | Beeman | ........................ 210/605 |
| 5,945,331 A | * | 8/1999 | Kozaki et al. | ............ 435/252.5 |
| 6,051,411 A | * | 4/2000 | Turtakovsky et al. | ........ 435/177 |
| 6,310,188 B1 | * | 10/2001 | Mukherjee | ................... 536/127 |

FOREIGN PATENT DOCUMENTS

EP    0962492 A1  * 12/1999

OTHER PUBLICATIONS

Harkness, M.R., "Use of Natural Slow Release Substrates in Enhanced Anaeerobic Biodegradation", presented at the 2nd Int. Conf. on Remediation of Chlorinated and Recalcitrant Compounds, Monterey, CA, May 22–25, 2000, pp. 9–14.

Koenigsberg, S.S. and W.A. Farone. 1999. "The Use of Hydrogen Release Compounds (HRCtm) for CAH Bioremediation." In Engineered Approaches for In Situ Bioremediation of Chlorinated Solvent Contamination. Battelle Press, Columbus, OH, pp. 67–72.

Lee, M.D., R.J. Buchanan, Jr., D.E. Ellis, "Laboratory Studies Using Edible Oils to Support Reductive Dechlorination", presented at the 2nd International Conf. on Remediation of Chlorinated and Recalcitrant Compounds, Monterey, CA, May 22–25, 2000, pp. 77–84.

Boulicault, K.J., R.E. Hinchee, T.H. Wiedemeier, S.W. Hoxworth, T.P. Swingle. "Vegoil: A Novel Approach for Stimulating Reductive Dechlorination", presented at the 2nd Int. Conf. on Remediation of Chlorinated and Recalcitrant Compounds, Monterey, CA, May 22–25, 2000pp. 1–7.

deBruin, W.P., M.J.J. Kotterman, M.A. Posthumus, G. Schraa, A.J.B. Zehnder. 1992. "Complete Biological Reductive Dechlorination of Retrachloroethene to Ethane", Appl. Environ. Microbiol. 58: 1996–2000.

Haas, P.E., C.E. Aziz, P. Cork. "In Situ Biowall Containing Organic Mulch Promotes Chlorinated Solvent Bioremediation", presented at the 2nd Intl. Conf. on Remediation of Chlorinated and Recalcitrant Compounds, Monterey, CA, May 22–25, 2000, pp. 71–76.

* cited by examiner

Primary Examiner—David A. Redding
(74) Attorney, Agent, or Firm—Scully, Scott, Murphy & Presser

(57) ABSTRACT

Contaminated media is treated in a process which comprises adding at least one electron donor to contaminated media under anaerobic conditions to dehalogenate at least one halogen on at least one halogenated hydrocarbon in the presence of dehalogenating microorganisms wherein the electron donor comprises chitin, chitin-derivative, or combinations thereof.

48 Claims, 3 Drawing Sheets

METHOD FOR TREATING CONTAMINATED MEDIA

BACKGROUND OF THE INVENTION

The present invention relates to a method for the remediation of media. More particularly, the present invention relates to dehalogenation of halogenated hydrocarbons in soil and water.

Chlorinated hydrocarbons are known to contaminate the soil and groundwater at thousands of sites throughout the United States and other parts of the world. Halogenated hydrocarbons are soluble in groundwater and can therefore be transported to drinking water reservoirs where they may pose serious health hazards. In many groundwater aquifers, halogenated hydrocarbons undergo only limited transformation and must therefore be removed prior to entry into drinking water.

Trichloroethylene, a volatile, chlorinated aliphatic hydrocarbon, is regarded as the most prevalent groundwater contaminant in the United States, being the most frequently reported contaminant at hazard waste sites on the National Priority List of the United Stated Environmental Protection Agency. The wide distribution of trichloroethylene can be attributed to its excellent solvent and degreasing properties which made it desirable for industrial applications. The use of trichloroethylenes became subject to regulation when they were found to be suspected carcinogen in mice. Trichloroethylene is one of the fourteen volatile organic compounds (VOC) regulated under the Safe Drinking Water Act Amendments of 1986. Other chlorinated hydrocarbons of concern include tetrachloroethylene, dichloroethylene, vinyl chloride, 1,1,1-trichloroethane, 1,1-dichloroethane, chloroethane, carbon tetrachloride, chloroform, and dichloromethane.

Bioremediation is one of the methods used to stimulate in situ degradation of contaminants. For example, biodegradation of contaminants by indigenous microbial populations is common, and in many aerobic environments, the addition of nutrients to stimulate the growth of microorganisms can be an effective bioremediation tool in the cleanup of petroleum hydrocarbons. These processes rely on oxidative degradation under aerobic conditions, and the microbes use the contaminant itself as a carbon and energy source.

Anaerobic approaches to in situ bioremediation are generally thought to be less expensive and less invasive than aerobic approaches, largely due to the high cost and engineering challenge associated with the subsurface delivery of oxygen. In anaerobic environments, chlorinated solvents may be bioremediated in a process of sequential chloride removal called reductive dehalogenation. For example, tetrachloroethylene can be dehalogenated via this process to ethene, an innocuous end product, through the following sequence of intermediates. Tetrachloroethylene can be reduced to trichloroethylene. Trichloroethylene can be reduced to dichloroethylene. Dichloroethylene can be reduced to vinyl chloride. Vinyl chloride can be reduced to ethene.

In order for reductive dehalogenation to occur, an electron donor must be present to provide energy for growth and maintenance of the dehalogenating microorganisms. Conventional supplied materials used to support the bioremediation of chlorinated hydrocarbons have typically been soluble liquids, such as lactic acid, methanol, or molasses. These materials degrade or dissipate rapidly, and therefore require continuous or semi-continuous addition in order to sustain reductive dehalogenation. Use of these materials can also cause bacterial plugging of injection wells. Recently, lactic acid polymers have been developed which can be mixed with soils, place in monitoring wells, or injected into the subsurface. These viscous polymers break down slowly, releasing electron donor at a slower rate and sustaining dehalogenation over a longer period than soluble substrates. Subsequently, system design, construction, and operation and maintenance costs are much lower using these materials. However, the cost of commercial lactic acid polymer is very high. This is a significant problem because the major cost of anaerobic biodegradation systems utilizing slow release substrates lies in the material cost of the electron donor itself.

In order to bioremediate soil, microbial carriers have been studied. Kozaki et al. (European Patent No. 0 594 125 A2) discuss the use of natural polymers as a carrier for supporting microorganisms used in soil remediation, but not as an electron donor for the bioremediation process itself. In addition, Kozaki et al. are concerned with aerobic biodegradation, not with the anaerobic reductive dehalogenation of chlorinated hydrocarbons.

Generally, it is desirable to bioremediate contaminated soil without the need for continuous or semi-continuous addition. New techniques are constantly being sought to improve the bioremediation process which are both efficient and do not require constant reapplication.

BRIEF SUMMARY OF THE INVENTION

The present invention provides a process for treating contaminated media which comprises adding at least one electron donor to contaminated media under anaerobic conditions to dehalogenate at least one halogen on at least one halogenated hydrocarbon in the presence of dehalogenating microorganisms wherein the electron donor comprises chitin, chitin-derivative, or combinations thereof.

A further embodiment of the present invention provides a method for enhancing the anaerobic biodegradation of at least one halogen on at least one halogenated hydrocarbon comprising the steps of:

optionally processing the chitin, chitin-derivative, or combinations thereof before exposing the chitin, chitin-derivative, or combinations thereof to the halogenated hydrocarbon, and exposing the chitin, chitin-derivative, or combinations thereof to the halogenated hydrocarbon in the presence of dehalogenating microorganisms.

A further embodiment of the present invention provides a system for treating contaminated media comprising:

at least one electron donor comprising chitin, chitin-derivative, or combinations thereof wherein the electron donor is added to contaminated media under anaerobic conditions to dehalogenate at least one halogen on at least one halogenated hydrocarbon; and dehalogenating microorganisms.

DETAILED DESCRIPTION OF THE INVENTION

Figure 1:
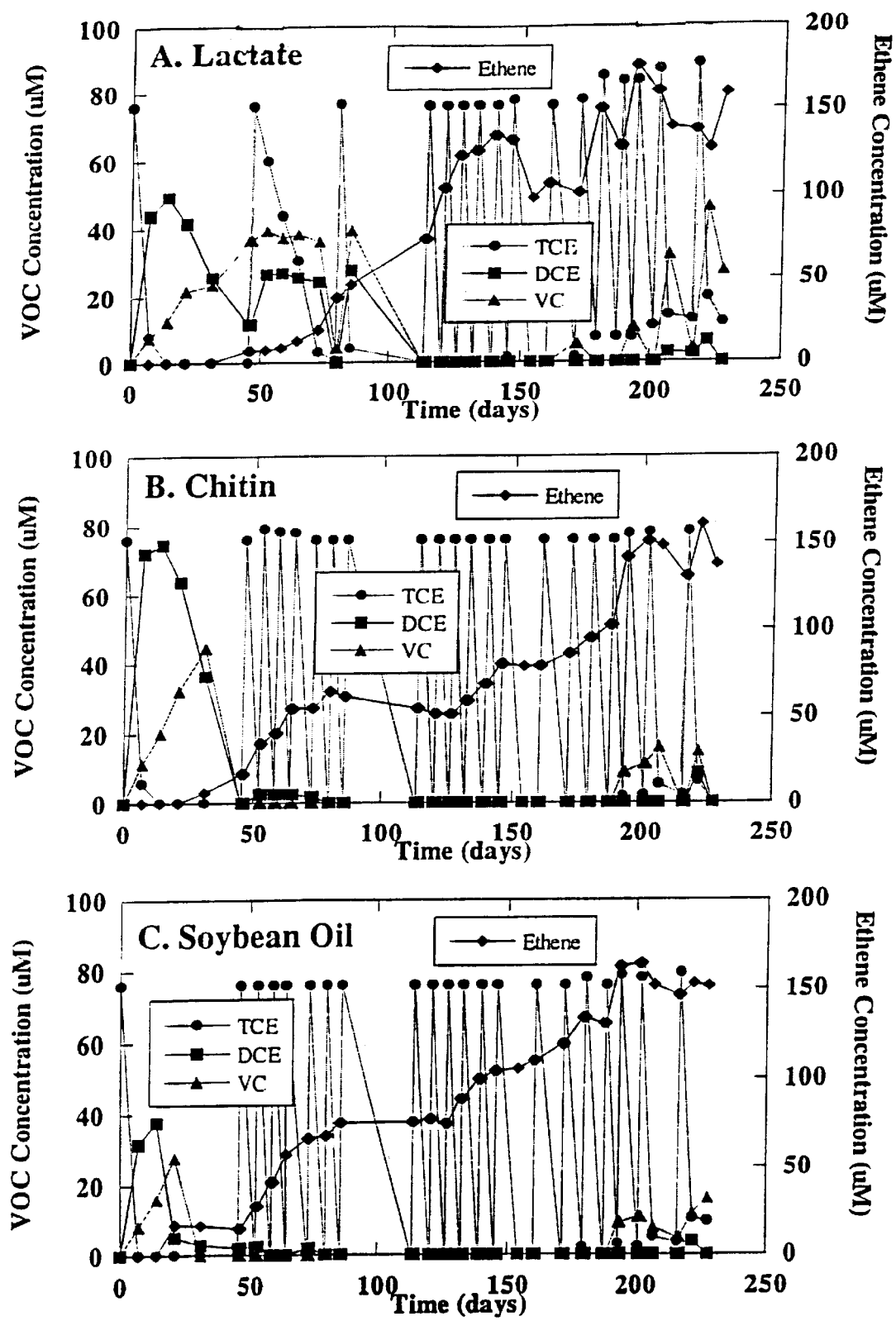
FIG. 1 is a graph of the reductive dehalogenation of trichloroethylene by the Pinellas consortium when amended with (A) sodium lactate, (B) chitin, and (C) soybean oil. The bottles were periodically respiked with trichloroethylene.

The present invention is based on the use of chitin and chitin-derivatives as electron donors for supporting the bioremediation of media. "Bioremediation" as used herein refers to the dehalogenation of at least one halogen on at least one halogenated hydrocarbon by microbes or other microorganisms. "Dehalogenation" as used herein refers to the process of removing halogenated moieties, for example, chloride, bromide, iodide, or fluoride, which is covalently bonded to a hydrocarbon which contains at least one of the aforementioned moiety. In the present invention, halogenated solvents may be bioremediated in a process of sequential removal of a halogen moiety, otherwise known as reductive dehalogenation. In this process, microorganisms use the halogenated hydrocarbon as an electron acceptor, while using either a reduced hydrocarbon or hydrogen as an electron donor. "Electron acceptor" as used herein refers to an electron deficient molecule. "Electron donor" as used herein refers to a species possessing at least one electron rich site.

The chitin or chitin-derivative acts as an electron donor, for example, degradation of the chitin produces hydrogen molecules that provide energy to dehalogenating microorganisms and result in the removal of a halogenated moiety from the hydrocarbon. Typical media include soil, groundwater, aquifer material, and combinations thereof. The use of chitin and chitin-derivatives produces end products such as ethene and ethane which are not harmful to the environment.

Chitin is of the general formula $C_{16}H_{26}O_{10}N_2$. Typically, the chitin is derived from natural sources, for example, shrimp, crab, lobster, or krill shells. The shells may be processed to produce chitin-derivatives. For instance, the chitin may be treated with base, for example, sodium hydroxide, to deproteinize the material. The chitin may then be treated with an acid, for example, hydrochloric acid, to demineralize the material, for example, by extracting calcium carbonate and calcium phosphate.

Chitin and chitin-derivatives include, but are not limited to o-acylchitin; alkalichitin such as o-alkylchitin, chitin xanthogenat, o-hydroxyalkylchitin, o-carboxymethylchitin, and o-carboxymethylchitosan; and chitosan such as n,o-carboxymethylchitosan, n-acylchitosan, n-carboxylacylchitosan, quarternized chitosan, n-alkylidenechitosan, n-alkylchitosan, n-carboxyalkylidenechitosan, and hydroxyalkylchitosan.

Chitin is a solid that is insoluble in most organic solvents as well as water. Chitin and chitin-derivatives support reductive dechlorination of chlorinated hydrocarbons over extended time periods when added to soil, groundwater, or laboratory media containing halogenated hydrocarbons and microorganisms capable of reductive dehalogenation, without the need to reapply the electron donor.

In order for reductive dehalogenation to occur at a site, the site must have a pH in a range between about 4 and about 10, a temperature in a range between about 0° C. and about 40° C., a suitably low oxygen concentration wherein there is less than about 1.0 milligram of dissolved oxygen per liter of groundwater, an anaerobicity wherein the oxidation reduction potential is less than about 0 millivolts, a steady supply of electron donor, and the presence of microorganisms capable of reductive dehalogenation. When a site does not have a suitably low oxygen concentration or the appropriate anaerobicity under natural conditions due to lack of an adequate supply of electron donor, these conditions can be created by the addition of chitin and chitin-derivatives. For instance, the chitin and chitin-derivatives can be degraded by aerobic bacteria, depleting the available oxygen and causing the groundwater to become anaerobic.

Microorganisms which are typically present in the media include, but are not limited to, Dehalobacter restrictus, Dehalospirillum multivorans, Enterobacter agglomerans, and Dehalococcus ethenogenes. If the microorganisms are not present in the media, the microorganisms can be provided. The dehalogenating microorganisms require nitrogen as a supplemental nutrient for growth. Because nitrogen is already present in the chitin, the addition of other nitrogen containing nutrients is unnecessary.

Typical contaminates include, but are not limited to, halogenated hydrocarbons wherein the number of carbons is in a range between about 1 and about 2, and more typically 2 carbons. The halogenated hydrocarbons of concern include, but are not limited to, trichloroethylene, tetrachloroethylene, dichloroethylene, vinyl chloride, 1,1,1-trichloroethane, 1,1-dichloroethane, chloroethane, carbon tetrachloride, chloroform, and dichloromethane. Other halogenated hydrocarbons of concern may include brominated, fluorinated, and iodinated hydrocarbons.

Chitin or chitin-derivatives may be added to the contaminated media but any convenient means. For instance, the chitin or chitin-derivatives may be added in situ or ex situ. The in situ methods entail, for instance, mixing chitin or chitin-derivatives directly into the soil, placing chitin or chitin-derivatives into monitoring wells, or slurrying the chitin or chitin-derivative in an aqueous medium, for instance water, and injected or otherwise placing the slurry into the subsurface using a Geoprobe™ or other similar equipment. Geoprobe and related equipment allow materials to be injected directly into subsurface soils. "Subsurface" as used herein refers to soil, groundwater, aquifer material, or combinations thereof below the ground surface. Typically, the chitin is slurried in water. The amount of chitin or chitin-derivative in a suitable slurry is typically in a range between about 5% and about 50% by weight and more typically, in a range between about 10% by weight and about 20% by weight. In addition, the common ratio of halogenated hydrocarbon to chitin or chitin-derivative is in a range between about 1:5 and about 1:75 by weight, more commonly, in a range between about 1:25 and about 1:75 by weight, and most commonly, in a range between about 1:40 and about 1:60 by weight. Due to the slow nature of the degradation of chitin and chitin-derivatives and its ability to support the reductive dehalogenation of halogenated hydrocarbons over long periods, frequent repeat additions of the chitin and chitin-derivatives are not necessary. For example, the lifetime of chitin in supporting reductive dehalogenation is greater than a year.

For ex situ methods, the contaminated media is removed from the subsurface, mixed with chitin or chitin-derivatives, and treated on the surface under anaerobic conditions.

In order that those skilled in the art will be better able to practice the present invention, the following examples are given by way of illustration, and not by way of limitation.

EXAMPLE 1

Chitin was used to support the reductive dehalogenation of trichloroethylene by the Pinellas consortium in laboratory media. The Pinellas consortium is a crude enrichment of dehalogenating bacteria capable of dehalogenating trichloroethylene to ethene. The Pinellas consortium was carried in 120 milliliter serum bottles containing reduced anaerobic mineral media (RAMM) spiked with trichloroethylene. In this example, either chitin or soybean oil was added to the Pinellas bottles as slow release electron donors and their ability to sustain dehalogenation was compared to that of sodium lactate. When sodium lactate was used as the electron donor, it was added every seven to fourteen days in order to sustain the consortium.

The RAMM was filtered sterilized, sparged with nitrogen to remove oxygen, and placed into an anaerobic chamber. The media (75 milliliters) was added to four serum bottles and each bottle was bioaugmented with 5 milliliters of the Pinellas consortium. The bottles were them crimp sealed with butyl rubber stoppers. Yeast extract (0.2 milliliters of 30 grams per liter solution) was added to all the bottles. Bottles A and B were amended with sodium lactate (1 milliliter of 0.5 molar solution). Bottle C was amended with ground chitin (0.5 grams) and bottle D was amended with soybean oil (0.5 grams). Trichloroethylene (0.5 milliliters of saturated trichloroethylene solution) was added to all the bottles, creating an initial trichloroethylene concentration of 10 milligrams per liter.

Sodium lactate was added to bottles A and B on a weekly basis. Bottles C and D were not reamended during the 230 day study. Transformation of the chlorinated hydrocarbons in the bottles was monitored on a weekly or bimonthly basis by a purge and trap methodology using gas chromatography (GC) with a flame ionization detector (FID). The bottles were periodically respiked with trichloroethylene.

It took about 50 days for the complete reductive dehalogenation of trichloroethylene to ethene to become established in the lactate-amended bottles (FIG. 1). Once established, dehalogenation was fairly robust for another 180 days. Near the end of that time, trichloroethylene was not completely degraded and vinyl chloride began to accumulate in the bottles. Trichloroethylene dehalogenation in the chitin and soybean oil bottles was as good or better than dehalogention in the sodium lactate bottles, without the need for continuous reamendment of electron donor as seen in FIG. 1, which shows the transformation of micromolar ($\mu M$) amounts of volatile chlorinated hydrocarbons (VOC) to ethene in the media.

EXAMPLE 2

Chitin was used to support the reductive dehalogenation of trichloroethylene by native bacteria in soil and groundwater. In this case, soil and groundwater were obtained from Landfill 13 on the Dover Air Force Base in Dover, Delaware. This area is known to contain trichloroethylene dehalogenating microorganisms. In this example, chitin, chitosan, and a number of other slow release electron donors seen in Table 1 were added to bottles containing soil, groundwater, and trichloroethylene and their ability to support dehalogenation was monitored.

In this case, groundwater received from the site was filtered, sterilized, sparged with nitrogen to remove oxygen, and placed into an anaerobic chamber. A phosphate buffer containing $NH_4H_2PO_4$ and $K_2HPO_4$ was added to the water to a final concentration of 50 millimolar. Fifty grams (wet weight) of site soil and seventy-five milliliters of buffer-amended groundwater were added to 120 milliliter serum bottles. The bottles were then crimp sealed with butyl rubber stoppers. Yeast extract (0.2 milliliters of a 30 grams per liter solution) was added to all the bottles. One gram of the various slow release electron donors was added to the bottles. All the treatments were performed in duplicate. Sodium lactate (1 milliliter of a 0.5 molar solution) was added to one set of bottles as a positive control. Killed and unamended controls were also run with this experiment. Trichloroethylene (0.5 milliliters of saturated trichloroethylene solution) was added to all the bottles, creating an initial trichloroethylene concentration of 10 milligrams per liter.

Sodium lactate was added to the positive control on a weekly basis. The other bottles were not reamended during the 430 day study. Transformation of the chlorinated hydrocarbons in the bottles were monitored on a monthly basis by a purge and trap methodology using gas chromatography (GC) with a flame ionization detector (FID). The bottles were periodically respiked with trichloroethylene.

Figure 2:
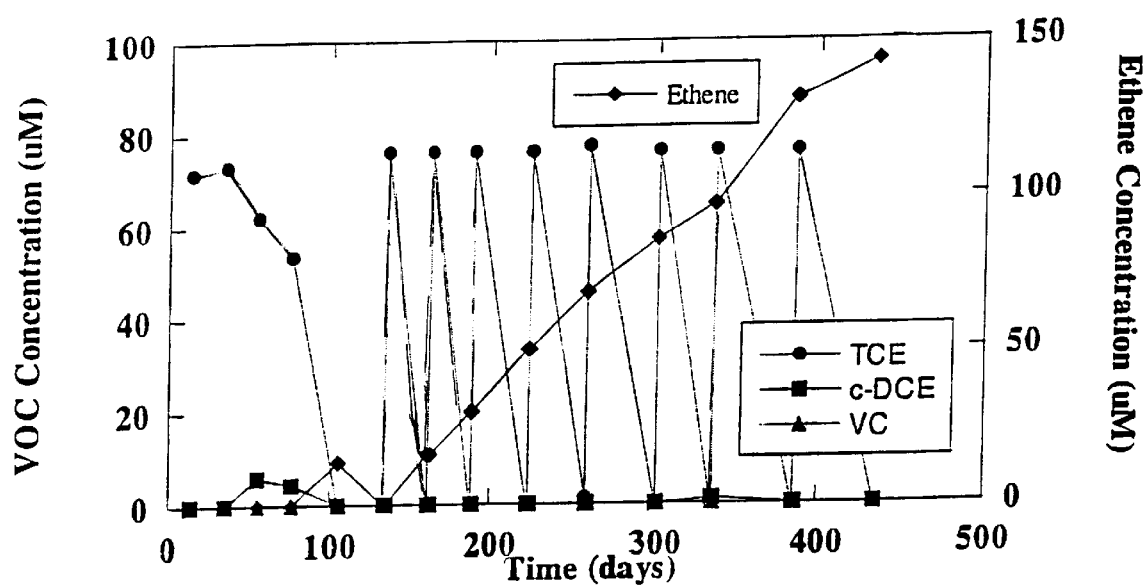
FIG. 2 is a graph of the reductive dehalogenation of trichloroethylene to ethene in Dover Landfill soil and groundwater in bottle amended with chitin. The bottles were periodically respiked with trichloroethylene.

Many of the electron donors tested supported the initial reductive dehalogenation of trichloroethylene to cis-dichloroethylene as seen in Table 1. Several supported complete dehalogenation of trichloroethylene to ethene. Of the materials tested, chitin was the fastest to support both initial and complete dehalogenation. Once complete dehalogenation was established, chitin was able to sustain that activity for more than 300 days (FIG. 2). Chitosan also supported rapid initial dehalogenation of trichloroethylene and eventually supported complete dehalogenation of trichloroethylene to ethene as well. Both chitin and chitosan supported methanogenesis in this study, which frequently accompanies the complete reductive dehalogenation of chlorinated hydrocarbons to ethene. FIG. 2 shows the transformation of the micromolar amounts of chlorinated hydrocarbons to ethene in soil and groundwater from Dover Landfill in bottles amended with chitin.

TABLE 1

| Donor | Time to Initial Dehalogenation (days) | Time to Complete Dehalogenation (days) | Methane formed |
|---|---|---|---|
| Chitin | 35 | 105 | Yes |
| Chitosan | 35 | 335 | Yes |
| Cellulose | 56 | 385 | Yes |
| Polycaprolactone | 133 | 160 | No |
| Coconut Oil | 188 | — | No |
| Polylactide-glycolide | 258 | 300 | Minimal |
| Peanut Oil | 258 | — | Minimal |
| Corn Oil | — | — | Minimal |
| Sodium Lactate | 56 | 258 | Yes |

EXAMPLE 3

Chitin was used to support the reductive dehalogenation of trichloroethylene by native bacteria in soil and groundwater. In this case, soil and groundwater were obtained from the GE Miller Duva site in Clay, N.Y. in order to determine if enhanced anaerobic bioremediation was a suitable remedial option for this site. At the time of the study, it was not known whether this area contained native microorganisms capable of the complete reductive dehalogenation of trichloroethylene to ethene. In this example, chitin, soybean oil, molasses, and sodium lactate were added to bottles containing soil, groundwater, and trichloroethylene and their ability to sustain dehalogenation was monitored.

In this case, groundwater received from the site was filter sterilized, sparged with nitrogen to remove oxygen, and placed into an anaerobic chamber. Two conditions were tested. In the first, a phosphate buffer containing $NH_4H_2PO_4$ and $K_2HPO_4$ was added to the water to a final concentration of 50 millimolar (low nutrient condition). In the second, concentrated RAMM was added to the groundwater (high nutrient condition). Fifty grams (wet weight) of site soil and 75 milliliters of groundwater were added to 120 milliliters serum bottles. The bottles were then crimp sealed with butyl rubber stoppers. Yeast extract (0.2 milliliters of 30 grams per liter solution) was added to all the bottles. Either sodium lactate (1 milliliter of 0.5 molar solution), molasses (1 milliliter of 5% molasses solution), chitin (0.5 grams) or soybean oil (0.5 grams) were added to the bottles containing either low nutrient or high nutrient groundwater. All the treatments were performed in duplicate. A killed control and unamended control were also run with this experiment. Trichloroethylene (0.5 milliliters of saturated trichloroethylene solution) was added to all the bottles, creating an initial trichloroethylene concentration of 10 milligrams per liter.

Sodium lactate and molasses were added to the bottles on a weekly basis. The other bottles were not reamended during the 170 day study. Transformation of the chlorinated hydrocarbons in the bottles was monitored on a bi-monthly or monthly basis by a purge and trap methodology using gas chromatography (GC) with a flame ionization detector (FID).

Figure 3:
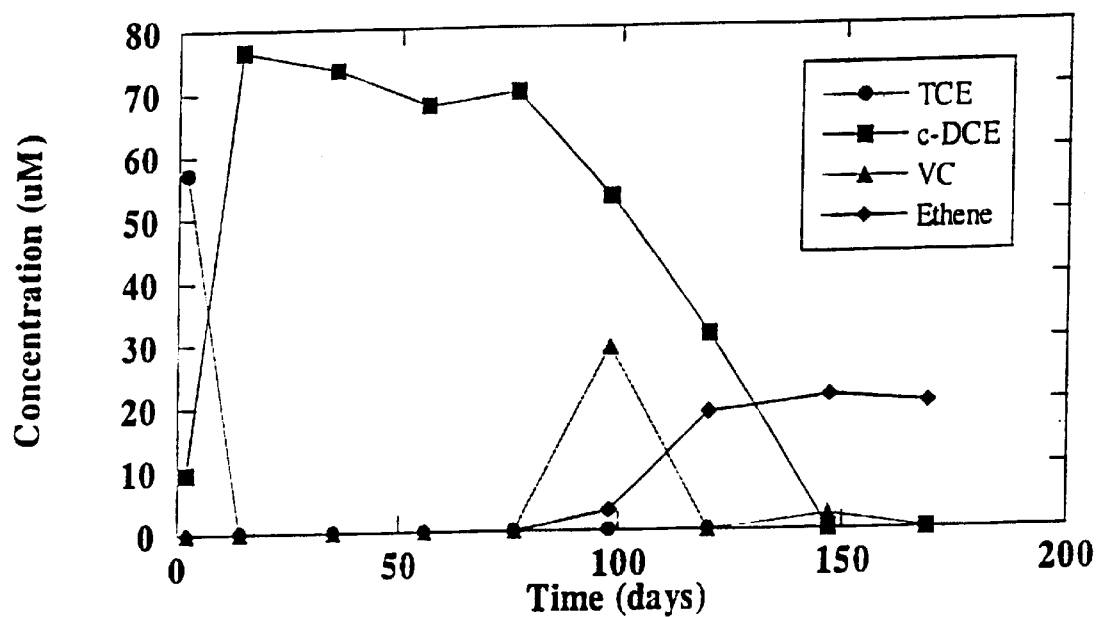
FIG. 3 is a graph of the reductive dehalogenation of trichloroethylene to ethene in Miller Duva soil and groundwater in bottles amended with chitin and low nutrients.

In this case, all the electron donors supported dehalogenation of trichloroethylene to cis-dichloroethylene in two days or less. As of 170 days, only chitin supported complete dehalogenation of trichloroethylene to ethene. Complete dehalogenation of trichloroethylene was first observed in the chitin-amended low nutrient bottles at 98 days as seen in FIG. 3 and was later observed in the high nutrient bottles at 147 days. Partial conversion of trichloroethylene to vinyl chloride was observed in the soybean oil bottles after 56 days, but conversion did not proceed beyond that point. No conversion of trichloroethylene beyond cis-dichloroethylene was noted in the lactate or molasses bottles. FIG. 3 shows the transformation of micromolar amounts of chlorinated hydrocarbons to ethene in soil and groundwater from Miller Duva in bottles amended with chitin and nutrients.

While typical embodiments have been set forth for the purpose of illustration, the foregoing descriptions should not be deemed to be a limitation on the scope of the present invention. Accordingly, various modifications, adaptations, and alternatives may occur to one skilled in the art without departing from the spirit and scope of the present invention.

What is claimed is:

1. A process for treating contaminated media which consists essentially of adding at least one electron donor to contaminated media under anaerobic conditions to dehalogenate at least one halogen on at least one halogenated hydrocarbon in the presence of dehalogenating microorganisms wherein the electron donor comprises chitin, a chitin-derivative or combinations thereof.

2. The process in accordance with claim 1, wherein the anaerobic conditions are naturally-occurring.

3. The process in accordance with claim 1, wherein the anaerobic conditions are created by the addition of chitin or chitin-derivative to the contaminated media.

4. The process in accordance with claim 1, wherein the media comprises soil, water, aquifer material, or combinations thereof contained in a subsurface below a ground surface.

5. The process in accordance with claim 4, wherein the chitin, chitin-derivative, or combinations thereof is mixed directly into the media in the subsurface.

6. The process in accordance with claim 4, wherein the chitin, chitin-derivative, or combinations thereof is mixed into the media after it has been removed from the subsurface.

7. The process in accordance with claim 1, wherein the dehalogenating microorganisms are naturally-occurring.

8. The process in accordance with claim 1, wherein the dehalogenating microorganisms are added to the contaminated media.

9. The process in accordance with claim 1, wherein the chitin, chitin-derivative or combinations thereof is present in a ratio of halogenated hydrocarbon to chitin, chitin-derivative or combinations thereof in a range of between about 1:5 and about 1:75 by weight.

10. The process in accordance with claim 9, wherein the chitin, chitin-derivative or combinations thereof is present in a ratio of halogenated hydrocarbon to chitin, chitin-derivative or combinations thereof in a range of between about 1:25 and about 1:75 by weight.

11. The process in accordance with claim 10, wherein the chitin, chitin-derivative or combinations thereof is present in a ratio of halogenated hydrocarbon to chitin, chitin-derivative or combinations thereof in a range of between about 1:40 and about 1:60 by weight.

12. The process in accordance with claim 1, wherein the halogen on the halogenated hydrocarbon comprises chloride, bromide, iodide, fluoride, or combinations thereof.

13. The process in accordance with claim 12, wherein the halogen on the halogenated hydrocarbon comprises chloride.

14. A process for treating contaminated media which consists essentially of adding at least one chitin, chitin-derivative or combinations thereof to contaminated media under anaerobic conditions to dechlorinate at least one chlorine on at least one chlorinated hydrocarbon in the presence of dehalogenating microorganisms wherein the chitin, chitin-derivative or combinations thereof is present in a ratio of chlorinated hydrocarbon to chitin, chitin-derivative or combinations thereof in a range of between about 1:40 and about 1:60 by weight.

15. A method for enhancing the anaerobic bioremediation of at least one halogen on at least one halogenated hydrocarbon consisting essentially of the steps of:
   optionally processing chitin, a chitin derivative or combinations thereof before exposing the chitin, chitin-derivative or combinations thereof to a halogenated hydrocarbon and
   exposing the chitin, chitin-derivative or combinations thereof to the halogenated hydrocarbon in the presence of dehalogenating microorganisms.

16. The method in accordance with claim 15, wherein the anaerobic conditions are naturally-occurring.

17. The method in accordance with claim 15, wherein, anaerobic conditions are created by the addition of chitin, chitin-derivative or combinations thereof.

18. The method in accordance with claim 15, wherein the dehalogenation occurs in contaminated media.

19. The method in accordance with claim 18, wherein the media comprises soil, water, aquifer material, or combinations thereof contained in a subsurface below a ground surface.

20. The method in accordance with claim 19, wherein the chitin, chitin-derivative, or combinations thereof is mixed directly into the media in the subsurface.

21. The method in accordance with claim 19, wherein the chitin, chitin-derivative, or combinations thereof is mixed into the media after it has been removed from the subsurface.

22. The method in accordance with claim 15, wherein the dehalogenating microorganisms are naturally-occurring.

23. The method in accordance with claim 18, wherein the dehalogenating microorganisms are added to the contaminated media.

24. The method in accordance with claim 15, wherein the chitin, chitin-derivative or combinations thereof is present in a ratio of halogenated hydrocarbon to chitin, chitin-derivative or combinations thereof in a range of between about 1:5 and about 1:75 by weight.

25. The method in accordance with claim 24, wherein the chitin, chitin-derivative or combinations thereof is present in a ratio of halogenated hydrocarbon to chitin, chitin-derivative or combinations thereof in a range of between about 1:25 and about 1:75 by weight.

26. The method in accordance with claim 25, wherein the chitin, chitin-derivative or combinations thereof is present in a ratio of halogenated hydrocarbon to chitin, chitin-derivative or combinations thereof in a range of between about 1:40 and about 1:60 by weight.

27. The method in accordance with claim 15, wherein the halogen on the halogenated hydrocarbon comprises chloride, bromide, iodide, fluoride, or combinations thereof.

28. The method in accordance with claim 27, wherein the halogen on the halogenated hydrocarbon comprises chloride.

29. The method in accordance with claim 15, wherein the processing of the chitin, chitin-derivative or combinations thereof comprises at least one of demineralization and deproteinization.

30. The method in accordance with claim 29, wherein demineralization comprises treating the chitin, chitin-derivative or combinations thereof with acid.

31. The method in accordance with claim 30, wherein the acid comprises hydrochloric acid.

32. The method in accordance with claim 29, wherein deproteinization comprises treating the chitin, chitin-derivative or combinations thereof with base.

33. The method in accordance with claim 32, wherein the base comprises sodium hydroxide.

34. A method of enhancing the anaerobic bioremediation of at least one chlorine on at least one chlorinated hydrocarbon consisting essentially of the steps of:
   optionally demineralizing and deproteinizing chitin, a chitin-derivative or combinations thereof before exposing the chitin, chitin-derivative or combinations thereof to a chlorinated hydrocarbon, and
   exposing the chitin, chitin-derivative or combinations thereof to the chlorinated hydrocarbon wherein the chitin, chitin-derivative or combinations thereof is present in a ratio of chlorinated hydrocarbon to chitin, chitin-derivative or combinations thereof in a range of between about 1:40 and about 1:60 by weight in the presence of dehalogenating microorganisms.

35. A system for treating contaminated media consisting essentially of:
   at least one electron donor comprising chitin, a chitin-derivative or combinations thereof wherein the electron donor is added to contaminated media under anaerobic conditions to dehalogenate at least one halogen on at least one halogenated hydrocarbon; and
   dehalogenating microorganisms.

36. The system in accordance with claim 35, wherein the anaerobic conditions are naturally-occurring.

37. The system in accordance with claim 35, wherein anaerobic conditions are created by the addition of the chitin, chitin-derivative or combinations thereof to the contaminated media.

38. The system in accordance with claim 35, wherein the media comprises soil, water, aquifer material, or combinations thereof contained in a subsurface below a ground surface.

39. The system in accordance with claim 38, wherein the chitin, chitin-derivative, or combinations thereof is mixed directly into the media in the subsurface.

40. The system in accordance with claim 38, wherein the chitin, chitin-derivative, or combinations thereof is mixed into the media after it has been removed from the subsurface.

41. The system in accordance with claim 35, wherein the dehalogenating microorganisms are naturally-occurring.

42. The system in accordance with claim 35, wherein the dehalogenating microorganisms are added to the contaminated media.

43. The system in accordance with claim 35, wherein the chitin, chitin-derivative or combinations thereof is present in a ratio of halogenated hydrocarbon to chitin, chitin-derivative or combinations thereof in a range of between about 1:5 and about 1:75 by weight.

44. The system in accordance with claim 43, wherein the chitin, chitin-derivative or combinations thereof is present in a ratio of halogenated hydrocarbon to chitin, chitin-derivative or combinations thereof in a range of between about 1:25 to about 1:75 by weight.

45. The system in accordance with claim 44, wherein the chitin, chitin-derivative or combinations thereof is present in a ratio of halogenated hydrocarbon to chitin, chitin-derivative or combinations thereof in a range of between about 1:40 and about 1:60 by weight.

46. The system in accordance with claim 35, wherein the halogen on the halogenated hydrocarbon comprises chloride, bromide, iodide, fluoride, or combinations thereof.

47. The system in accordance with claim 46, wherein the halogen on the halogenated hydrocarbon comprises chloride.

48. A system for treating contaminated media consisting essentially of:
   at least one chitin, chitin-derivative or combinations thereof added to contaminated media under anaerobic conditions to dechlorinate at least one chlorine on at least one chlorinated hydrocarbon wherein the chitin, chitin derivative or combinations thereof is present in a ratio of chlorinated hydrocarbon to chitin, chitin-derivative or combinations thereof in a range of between about 1:40 and about 1:60 by weight; and
   dehalogenating microorganisms.

* * * * *